(12) United States Patent
Berstis et al.

(10) Patent No.: US 6,718,341 B1
(45) Date of Patent: Apr. 6, 2004

(54) STORE EMPLOYEE LOCATOR SYSTEM

(75) Inventors: Viktors Berstis, Austin, TX (US); Linda Arnold Lisle, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 09/239,338

(22) Filed: Jan. 28, 1999

(51) Int. Cl.[7] ............................................... G06F 17/00
(52) U.S. Cl. ........................ 707/104.1; 707/2; 345/700
(58) Field of Search .............................. 707/104, 104.1, 707/1, 2; 705/7, 8, 9; 345/326, 329, 700

(56) References Cited

U.S. PATENT DOCUMENTS

| | | | | |
|---|---|---|---|---|
| 4,918,425 A | * | 4/1990 | Greenberg et al. | 340/539 |
| 5,255,183 A | * | 10/1993 | Katz | 705/30 |
| 5,971,580 A | * | 10/1999 | Hall et al. | 364/188 |
| 5,977,913 A | * | 11/1999 | Christ | 342/465 |
| 5,995,015 A | * | 11/1999 | DeTemple et al. | 340/825.49 |
| 6,049,776 A | * | 4/2000 | Donnelly et al. | 705/8 |
| 6,067,030 A | * | 5/2000 | Burnett et al. | 340/870.05 |
| 6,123,259 A | * | 9/2000 | Ogasawara | 235/380 |

FOREIGN PATENT DOCUMENTS

WO        98/38589    *   9/1998        G06F/17/60

* cited by examiner

*Primary Examiner*—Uyen Le
(74) *Attorney, Agent, or Firm*—Jeffrey S. LaBaw (57) ABSTRACT

The invention locates store employees by receiving a set of unique signature transmissions by a set of receivers on the store. Each transmission emanates from a badge worn by a store employee. In a database, each unique signature with an employee and employee biographical information, including an expertise of an employee. The transmissions from the badges are used to locate employees in the store. Responsive to a user request for employees having a given expertise, a store map is displayed on an informational kiosk wherein showing the location of the employees having the given expertise.

19 Claims, 7 Drawing Sheets

What type of question do you have? ~103

Plumbing ~105

Electrical ~107

Hardware ~109

Gardening ~113

STORE EMPLOYEE LOCATOR SYSTEM

BACKGROUND OF THE INVENTION

This invention relates generally to determining the position of transmitters. More particularly, the invention relates to a computerized system for locating individuals having a particular expertise.

Computers have proliferated to every aspect of society. Commerce is no exception. Customers have become familiar and at least somewhat comfortable with interacting with informational kiosks as well as conducting electronic transactions with point of sale terminals. While the informational kiosks can provide the answers to general questions, it is rare that the specialized questions can be answered or indeed anticipated. Therefore, there remains a need to locate the store employee with the expertise for the particular problem of the customer.

At present, customers are forced to wander the aisles of the store in search of the specific employee who can help them. While it often possible to identify employees by sight because of a uniform, most customers, unless they frequent a store, have problems locating the one or group of employees most knowledgeable about the customer's questions.

The present invention proposes a solution to this problem.

SUMMARY OF THE INVENTION

The invention locates store employees by receiving a set of unique signature transmissions by a set of receivers on the store. Each transmission emanates from a badge worn by a store employee. In a database, each unique signature with an employee and employee biographical information, including an expertise of an employee. The transmissions from the badges are used to locate employees in the store. Responsive to a user request for employees having a given expertise, a store map is displayed on an informational kiosk wherein showing the location of the employees having the given expertise.

BRIEF DESCRIPTION OF THE DRAWINGS

The foregoing features, advantages and aspects of the invention will be better understood with reference to following detailed description which describes the accompanying drawings wherein.

DETAILED DESCRIPTION OF THE DRAWINGS

Note that the invention may be described in terms of selecting, comparing, determining or other terms that could be associated with a human operator. The reader should remember that the operations which form the invention are machine operations processing electrical signals to generate other electrical signals.

The invention addresses the common problem that in large stores like Home Depot, Walmart and others, it can be difficult to find information or employees that can give advice in the particular specialty in which one is interested. The invention provides kiosks at various places in the store with the usual browseable information, but in addition, each employee wears a little pager sized device which lets a locator system in the store know where they are located within the store and grounds. This information can be displayed on a map which is shown in the user interface of the kiosks. Thus, the customer is provided an automated means of finding the knowledgeable employee with the given specialty. This problem is not necessarily limited to a retail environment, although that is where the Applicants expect to find the widest application for the invention. Subject matter expertise would be useful to locate in such diverse environments as a library, a career day, a conference, a hospital, a entertainment park or a coaching environment.

Figure 1:
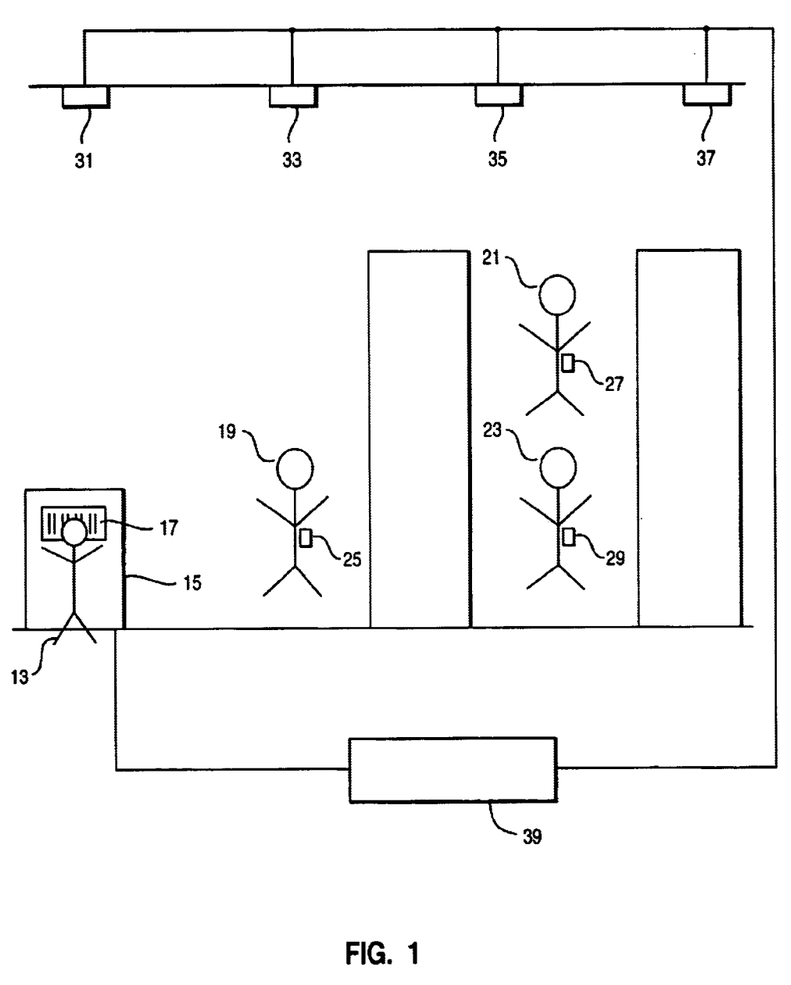
FIG. 1 depicts a store environment in which the present invention is installed including an informational kiosk, a set of receivers and store employees equipped with badges which broadcast a unique frequency.

FIG. 1 depicts a store environment in which the present invention is installed including an informational kiosk, a set of receivers and store employees equipped with badges which broadcast a unique frequency. The user 13 is known in front of an informational kiosk 15 which provides an array of information concerning the products which the store has to offer. Among the user interfaces provided is a map 17 of the store wherein the representations of the employees can be placed. Alternative embodiments of the invention could have a text listing of the employees' location, e.g., Joe Smith—Aisle A1; Peggy Jones—Aisle B2 and so forth. However, a map is thought to be the more intuitive and preferred embodiment.

The employees 19, 21, 23 go about their appointed rounds each equipped with their own badge 25, 27, 29. Each badge contains a transmitter which emits a unique signature. The signature emitted by the badges are received by a plurality of receivers 31, 33, 35, 37 located in the ceilings or other locations within the store. In general, the positions of the receivers should be chosen to allow the greatest line of sight coverage of the store interior, and if desired, store grounds as well. The transmitters and receivers could use any of several well known technologies including radio frequency (RF), ultrasound or infrared (IR) transmission mediums to transmit and receive the unique signatures. The unique signature and timing data is fed into a program at a central computer 39, or the kiosk computer 15, where the employees' locations are calculated. Upon the request of the user, the employees' locations are displayed.

There are many strategies which can be employed to calculate the employees' locations. A plethora of small receivers can be distributed every three feet or so in the store. Because of their number, the receivers would have very limited reception capabilities and consequently be very reasonable in cost. Each of the badges would likewise have a low powered transmitter so that the signal would only be received by one or a few of the receivers. The location of the transmitter which receives the highest signal strength for any given badge would be deemed the location of the employee. Alternatively, relatively fewer receivers could be employed in the store. The signal strength and timing could be used to trigonometrically determine the employees' locations. On a smaller scale, this is the process used by the GPS receivers which are becoming increasing common in a variety of applications.

Figure 2:
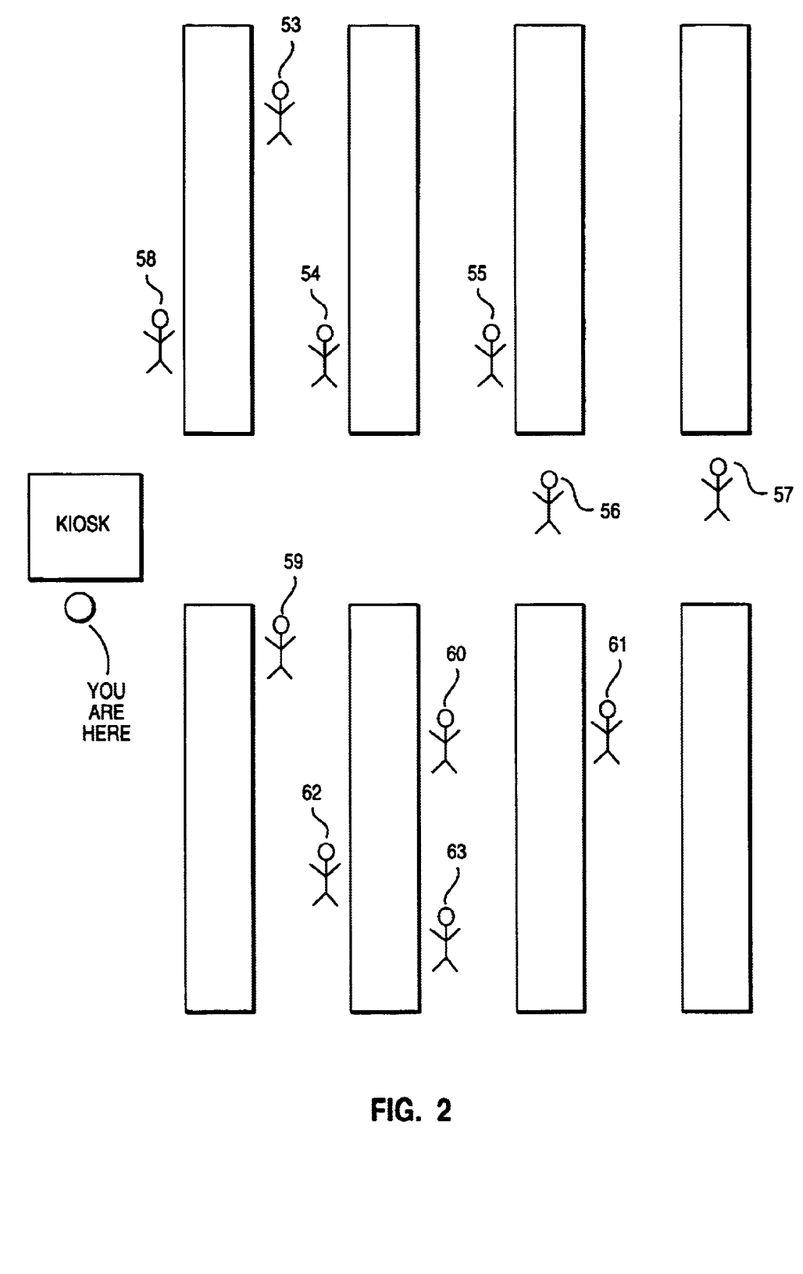
FIG. 2 illustrates a user interface on the informational kiosk showing a store map and the location of store employees.

FIG. 2 illustrates a user interface which might be displayed on the informational kiosk showing a store map 51 and the location of store employees 53–63. For ease in illustration, the map and employees are shown in rudimentary form. However, as is known in the art sophisticated "three-dimensional" interfaces are possible depicting a very realistic portrayal of the store, its contents and the employees. In this initial display, a caption box 65 is displayed showing the meaning of the stick figure icon as well as a selection box 67 for the question "Find employee?". If a user makes this selection, a second panel as shown in FIG. 3 is shown on the kiosk display.

Figure 3:
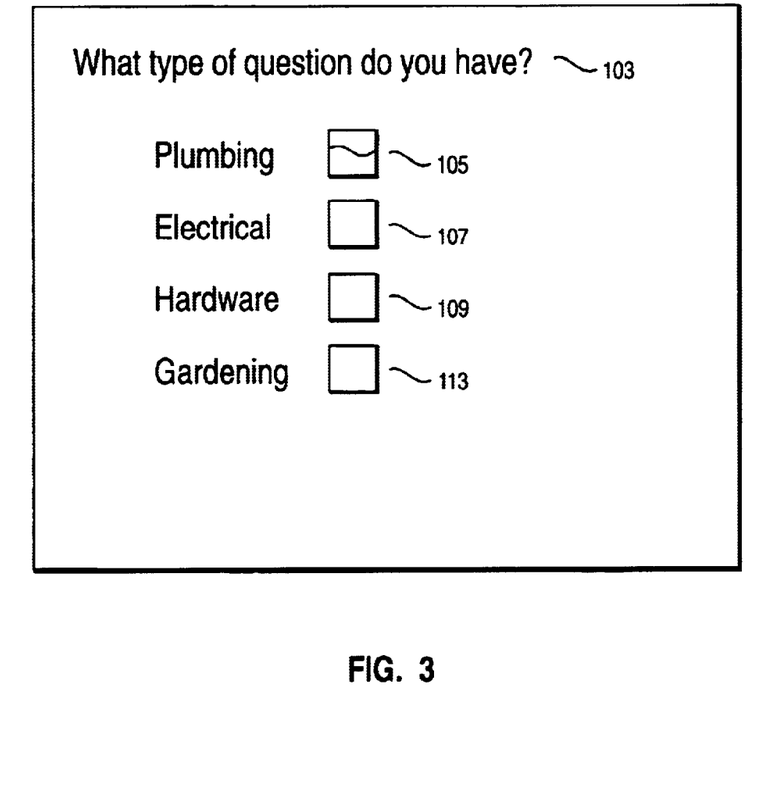
FIG. 3 shows a menu of a user interface from which a customer may choose to view the locations of employees with a specified expertise.

FIG. 3 shows a menu 101 of a user interface from which a customer may choose to view the locations of employees with a specified expertise. This menu 101 can be displayed concurrently with the store map in FIG. 2 or could be a full screen display which replaces it. Across the top of the panel, the question 103, "What type of question do you have?" is displayed. Below the question, a list of choices is shown: plumbing 105, electrical 107, hardware 109, gardening 113. The reader will appreciate that the list could be far more extensive. After the selection of one of the specialties by the user, the map interface reappears and changes.

Figure 4:
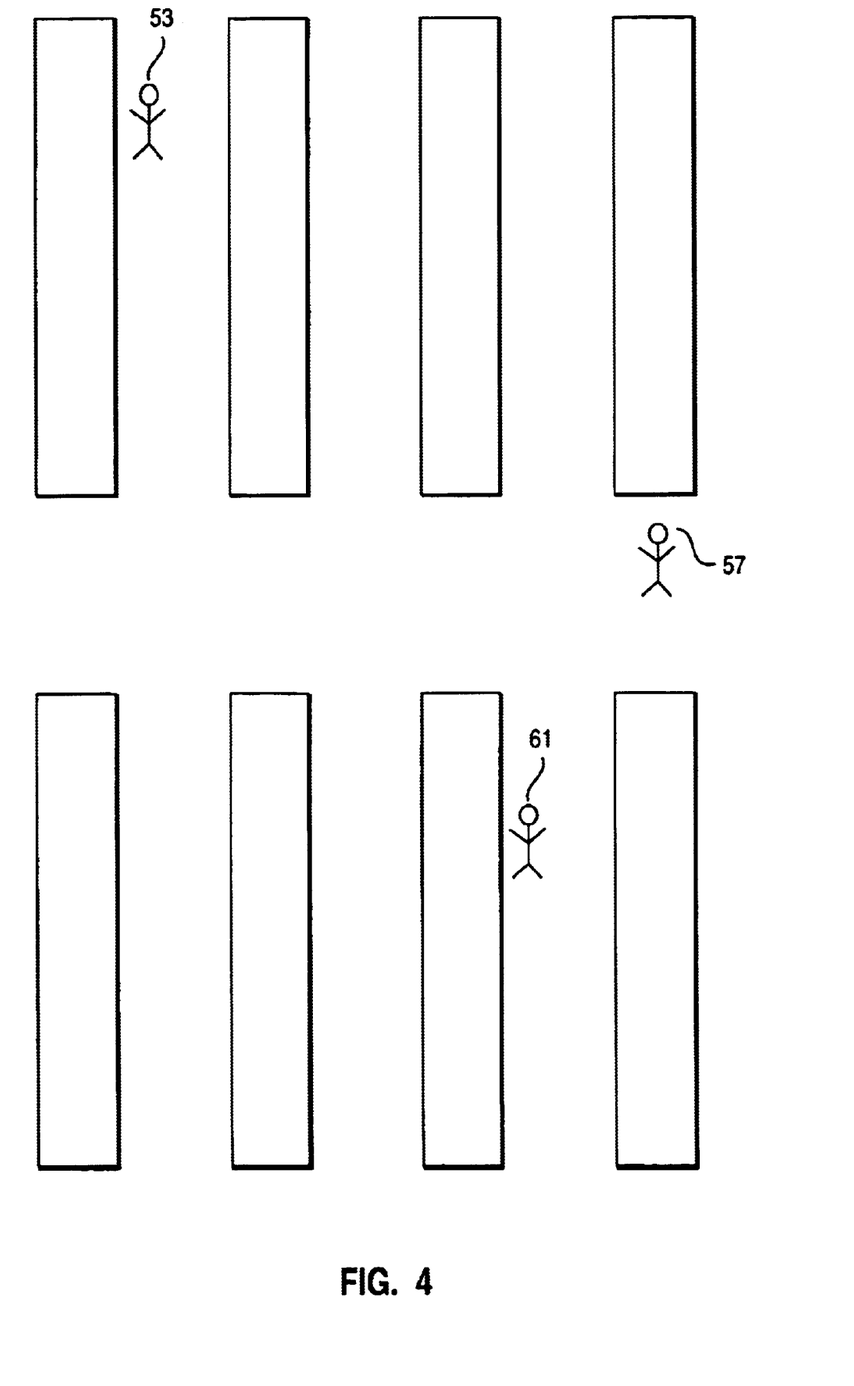
FIG. 4 illustrates the user interface after selection of a specified expertise.

FIG. 4 illustrates the user interface after selection of a specified expertise. For example, suppose the user selected "plumbing" as the type of question from the previous panel. The store map would change showing the plumbing experts. In this display only the icons 53, 57 and 61 which represent the location of the plumbing experts are shown. However, in an alternative embodiment, these icons could be highlighted in some way, e.g., color, to make them distinct in the interface in some way. The highlighting could be explained in the caption box, or the change itself in response to the previous selection makes the emphasis somewhat intuitive.

Some situations may cause computer to ignore a particular employee, e.g., on break.

As a refinement to the basic idea, the user can select one of the icons. A picture 151 of the employee would be displayed together with his name 153 and specialty 157. Other biographic information could be displayed as well. Thus, the customer knows not only where the employee is located, but also what the employee looks like before the customer embarks upon his quest. This idea can be obviously extended, e.g., display a three dimensional, rotating representation of the employee's head or body, however, the reader will appreciate the basic idea.

Figure 5:
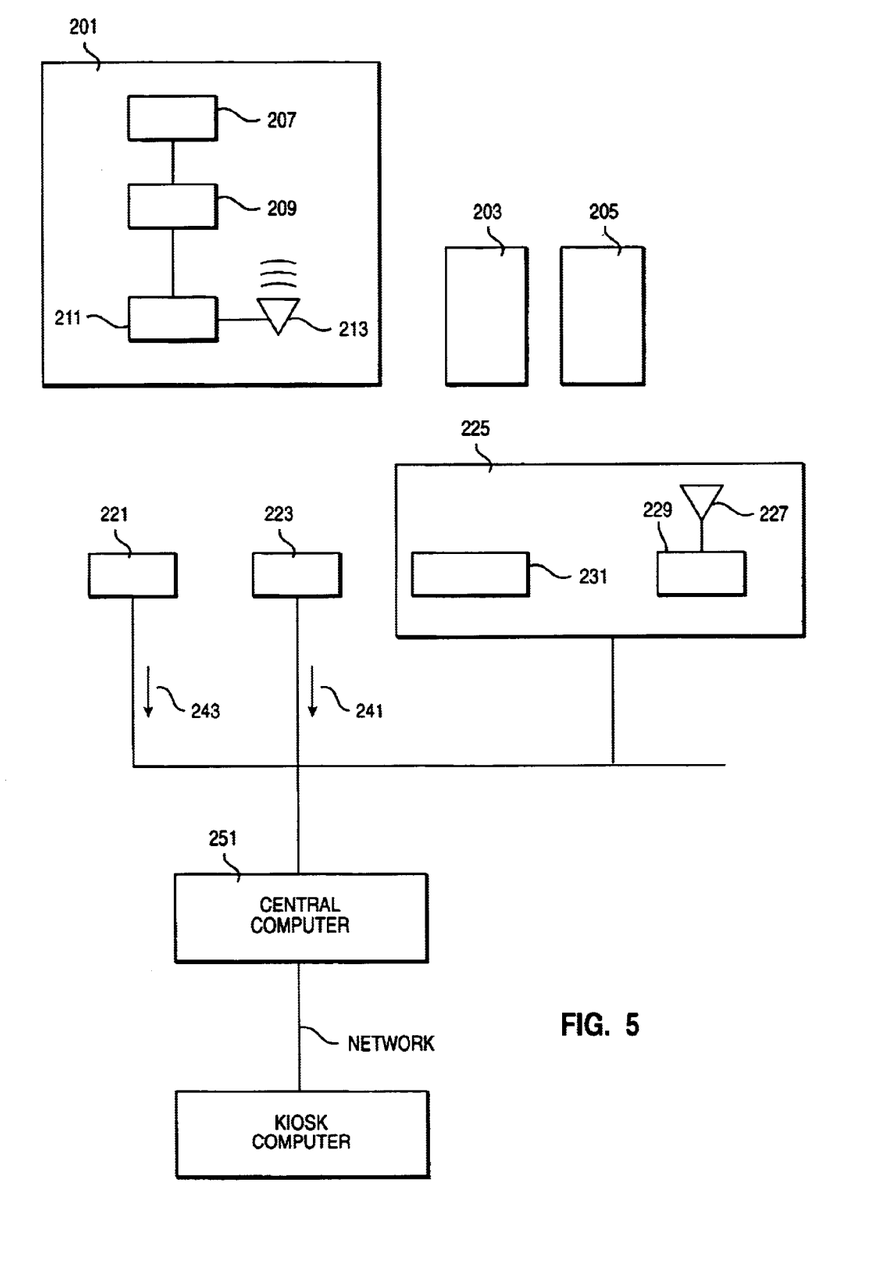
FIG. 5 is a block diagram of the computerized store employee location system.

FIG. 5 is a block diagram of the computerized store employee location system. A plurality of pager sized badges 201, 203 and 205 each assigned to a respective employee. Each emits its own unique signature. As mentioned above, a variety of transmission technologies could be used, RF, ultrasound, IR, which are well known technologies. In general, each badge will contain a power source 207, a codec 209 or other signature creation means, a modulator 211 and an antenna 213 or other emitter. The details will vary according to the transmission technology used.

The signals created by the badges will be received by one or more receivers 221, 223, 225 which are designed to receive the appropriate frequencies. The receivers in an RF embodiment would include an antenna 227, a local oscillator 229, and a demodulator 231. The demodulated signals 241, 243 are sent to the central computer 251 where they are time stamped. The time stamps and signal strengths are used to locate the badge in the store. The signature is looked up in a database which matches signatures to employees and their biographies including specialties. The detected employees who have the required expertise are identified. The location of the employees, their biographic material including pictures and so forth are all transmitted via a local area network to the kiosk computer which interacts with the customer. Alternatively, the biographies and pictures are already stored in the kiosk computer.

Figure 6:
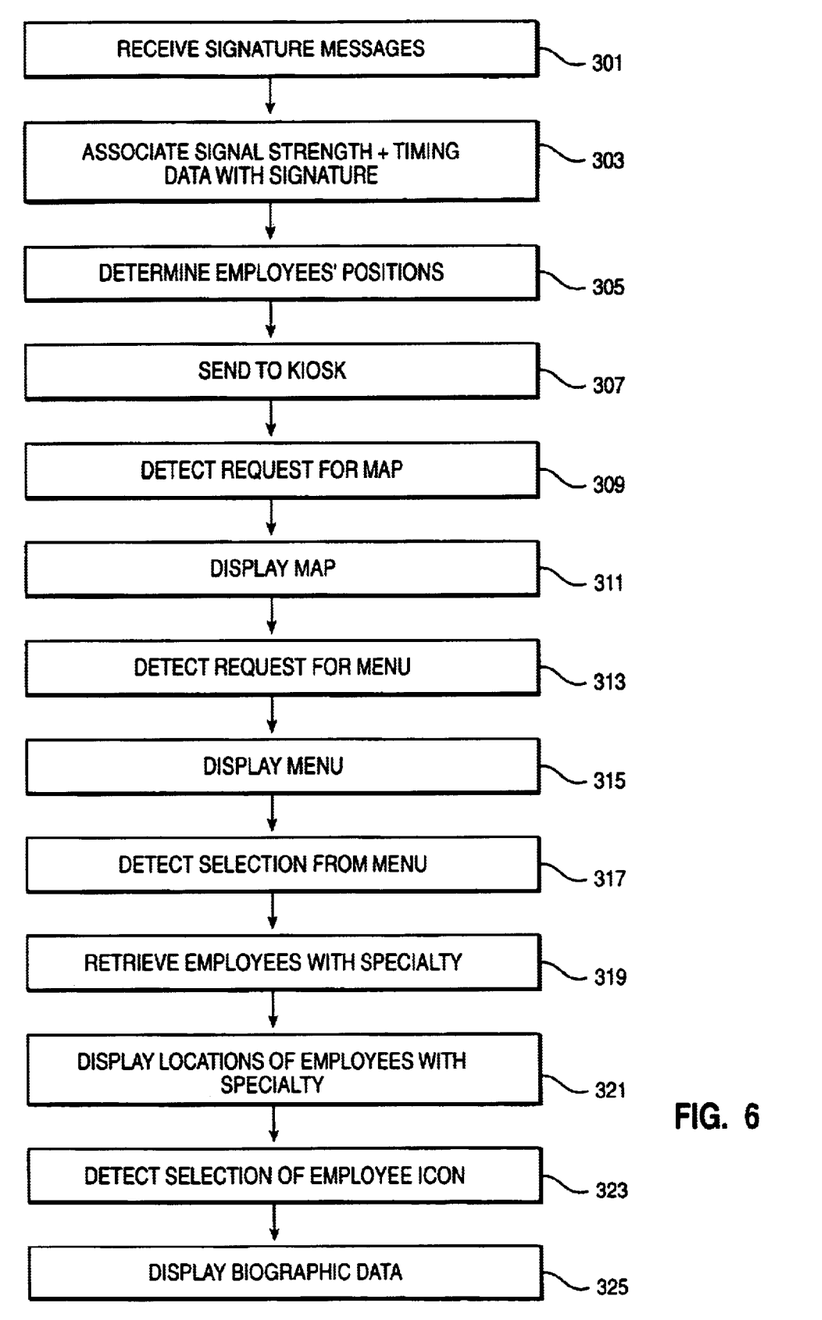
FIG. 6 is a flow diagram of the overall process of the present invention.

FIG. 6 is a flow diagram of the overall process of the present invention. The transmitters continually transmit their signatures on a constant or preferably on a periodic basis. In step 301, the signature messages from the various badges are received by the receivers. The signal strength and timing information for each signal is associated with the particular receiver, step 303. This information is used by the computer to determine the employees' positions, step 305. As mentioned previously, the trigonometric calculations used to determine the employees' positions are well known.

Each determined position together with an employee ID is sent to the kiosk computer interface, step 307. Depending on how the data is stored in the overall computer system, supplementary biographical information may be transmitted as well. In step 309, the kiosk computer has detected a user input request for the store map. In step 311, the store map is displayed together with the locations of the store employees. In step 313, the kiosk computer has detected a user request for the menu of employee specialties. In step 315, the employee specialty menu is displayed. In step 317, the kiosk computer has detected the selection of a particular specialty from the menu. The employees having that specialty are retrieved from memory, step 319, and matched against the locations sent from the central computer. In step 321, the locations of the employees having the desired specialty are displayed. Optionally, the employee who is closest to the customer is displayed with special emphasis or otherwise pointed out. In step 323, the computer has detected the selection of one of the employee icons. In response, the biographical information, e.g., name, picture and specialties are displayed.

Figure 7:
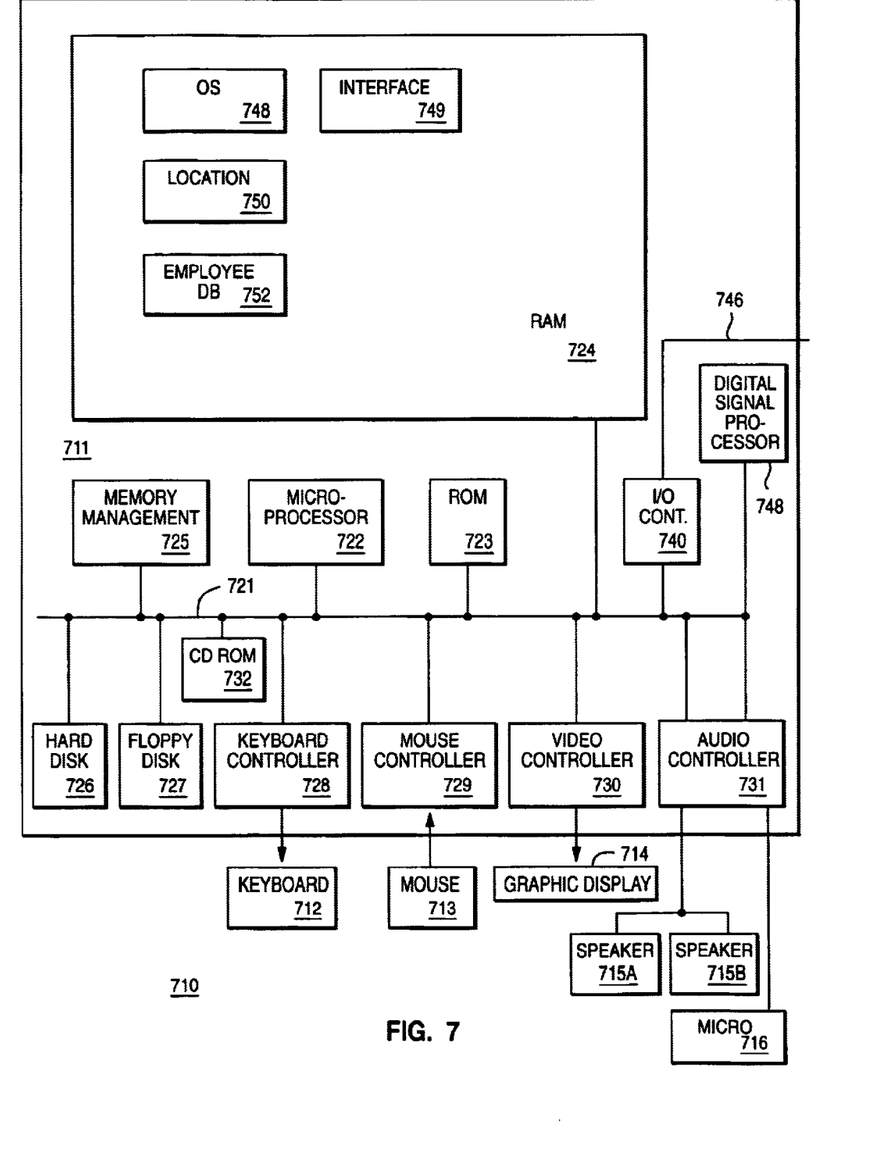
FIG. 7 is a block diagram of a general purpose computer system which can be used as the central computer or the informational kiosk.

FIG. 7 is a block diagram of a general purpose computer system which can be used as the central computer or the informational kiosk. A a computer 710, comprising a system unit 711, a keyboard 712, a mouse 713 and a display 714 are depicted in block diagram form. The system unit 711 includes a system bus or plurality of system buses 721 to which various components are coupled and by which communication between the various components is accomplished. The microprocessor 722 is connected to the system bus 721 and is supported by read only memory (ROM) 723 and random access memory (RAM) 724 also connected to system bus 721. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM might be used by the present invention. Other RISC chips made by Hewlett Packard, Sun, Motorola and others may be used in the specific computer.

The ROM 723 contains among other code the Basic Input-Output system (BIOS) which controls basic hardware operations such as the interaction of the processor with the disk drives and the keyboard. The RAM 724 is the main memory into which the operating system and application programs are loaded. The memory management chip 725 is connected to the system bus 721 and controls direct memory access operations including, passing data between the RAM 724 and hard disk drive 726 and floppy disk drive 727. The CD ROM drive 732 also coupled to the system bus 721 is used to store a large program or amount of data, e.g., a multimedia program or presentation.

Also connected to this system bus 721 are various I/O controllers: The keyboard controller 728, the mouse controller 729, the video controller 730, and the audio controller 731. As might be expected, the keyboard controller 728 provides the hardware interface for the keyboard 712, the mouse controller 729 provides the hardware interface for mouse 713, the video controller 730 is the hardware interface for the display 714, and the audio controller 731 is the hardware interface for the speakers 715. An I/O controller 740 such as a Token Ring Adapter enables communication over a network 746 to other similarly configured data processing systems.

One of the preferred implementations of the invention is as sets of instructions 748–752 resident in the random access memory 724 of one or more computer systems configured generally as described above. Until required by the computer system, the set of instructions may be stored in another computer readable memory, for example, in the hard disk drive 726, or in a removable memory such as an optical disk for eventual use in the CD-ROM 732 or in a floppy disk for eventual use in the floppy disk drive 727. Further, the set of instructions can be stored in the memory of another computer and transmitted in a transmission means such as a local area network or a wide area network such as the Internet when desired by the user. One skilled in the art knows that storage or transmission of the computer program product changes the medium electrically, magnetically, or chemically so that the medium carries computer readable information.

The present invention can be used in a wide variety of other environments to locate subject matter experts. At an entertainment park, a specified type of entertainer can be located. At the Disney parks, it might be very useful to locate the characters to appease the youngest members of the family. In sports clinics or conferences, it would be useful to locate the particular specialists who can answer the questions which motivated the participant to show up.

While the present invention, its features and advantages have been described with reference to certain illustrative embodiments, those skilled in the art would understand that various modifications, substitutions and alterations can be made without departing from the scope and spirit of the invention. Therefore, the invention should be not construed as being narrower than the appended claims.

We claim:

1. A method for locating store employees, comprising the steps of:
   receiving a set of unique signature transmissions by a set of receivers on the store, each transmission emanating from a respective transmitter worn by a store employee;
   associating each unique signature with employee biographical information, including an expertise of an employee;
   using the transmissions to locate employees in the store; and
   responsive to a user request for employees having a given expertise, displaying a store map on an informational kiosk display wherein a representation of the location of the employees having the given expertise is shown therein.

2. A method for locating subject matter experts, comprising the steps of:
   receiving a set of unique signature transmissions by a set of receivers, each transmission emanating from a respective transmitter worn by an expert;
   associating each unique signature with an expertise of an expert;
   using the transmissions to locate experts in the vicinity of the receivers; and
   responsive to a user request for an expert having a given expertise, displaying a location of at least one expert having the given expertise on a computer display.

3. The method as recited in claim 2 further comprising the steps of:
   displaying a map on the computer display; and
   responsive to the user requests, displaying representations of the expert on the map indicative of the location of the expert with respect to the computer display.

4. The method as recited in claim 2, wherein the locations of a plurality of experts are displayed and the location of a nearest expert is displayed in a highlighted manner.

5. The method as recited in claim 2, further comprising the step of responsive to user selection of an expert location, displaying biographical information about the expert.

6. The method as recited in claim 2, further comprising the steps of:
   testing each located expert for a status; and
   responsive to a respective located expert having a predetermined status, not displaying the located expert on the computer display.

7. A system for locating subject matter experts including processor, memory, input device and display, comprising:
   a set of receivers for receiving a set of unique signature transmissions, each transmission emanating from a respective transmitter worn by an expert;
   means for associating each unique signature with an expertise of an expert;
   means for using the transmissions to locate experts in the vicinity of the receivers; and
   means responsive to a user request for an expert having a given expertise for displaying a location of at least one expert having the given expertise on the display.

8. The system as recited in claim 7 further comprising:
   means for displaying a map on the display; and
   means responsive to the user requests for displaying representations of the expert on the map indicative of the location of the expert with respect to the computer display.

9. The system as recited in claim 7, wherein the locations of a plurality of experts are displayed and the location of a nearest expert is displayed in a highlighted manner.

10. The system as recited in claim 7, further comprising means responsive to user selection of an expert location for displaying biographical information about the expert.

11. The system as recited in claim 7, further comprising filtering means for filtering out located experts having a specified status from the display.

12. The system as recited in claim 7 wherein each transmitter is relatively low powered such that a strong signal is received by a respective one of the set of receivers relative to a remainder of the set of receivers.

13. The system as recited in claim 7 further comprising triangulating means to locate the transmitters.

14. The system as recited in claim 7 further comprising:
   one or more informational kiosks;
   a server computer; and
   a network for coupling the informational kiosks, the server computer and the receivers together.

15. A computer program product in a computer readable medium for locating subject matter experts, comprising:
   means for associating an unique signature with a respective transmitter of a set of transmitter and an expertise of an expert;

means for using the transmissions to locate experts in the vicinity of the receivers; and means responsive to a user request for an expert having a given expertise for displaying a location of at least one expert having the given expertise on a computer display.

16. The product as recited in claim 15 further comprising:

means for displaying a map on the display; and means responsive to the user requests for displaying representations of the expert on the map indicative of the location of the expert with respect to the computer display.

17. The product as recited in claim 15, wherein the locations of a plurality of experts are displayed and the location of a nearest expert is displayed in a highlighted manner.

18. The product as recited in claim 15, further comprising means responsive to user selection of an expert location for displaying biographical information about the expert.

19. The product as recited in claim 15, further comprising filtering means for filtering out located experts having a specified status from the display.

* * * * *